United States Patent [19]

Tanaka et al.

[11] Patent Number: 5,128,312
[45] Date of Patent: Jul. 7, 1992

[54] THERMAL TRANSFER DYE DONATING MATERIAL

[75] Inventors: Mitsugu Tanaka; Masakazu Morigaki; Seiiti Kubodera, all of Kanagawa, Japan

[73] Assignee: Fuji Photo Film Co., Ltd., Kanagawa, Japan

[21] Appl. No.: 730,749

[22] Filed: Jul. 16, 1991

[30] Foreign Application Priority Data

Jul. 17, 1990 [JP] Japan .................. 2-188241

[51] Int. Cl.⁵ .................. B41M 5/035; B41M 5/26
[52] U.S. Cl. .................. 503/227; 428/195; 428/336; 428/341; 428/342; 428/913; 428/914
[58] Field of Search .................. 8/471; 428/195, 336, 428/341, 342, 913, 914; 503/227

[56] References Cited

U.S. PATENT DOCUMENTS 4,873,220 10/1989 Kubodera et al. .................. 503/227

Primary Examiner—Bruce H. Hess
Attorney, Agent, or Firm—Sughrue, Mion, Zinn Macpeak & Seas

[57] ABSTRACT

Disclosed is a thermal transfer dye donating material, which has, on a support, a dye donating layer containing a dye of a general formula (I):

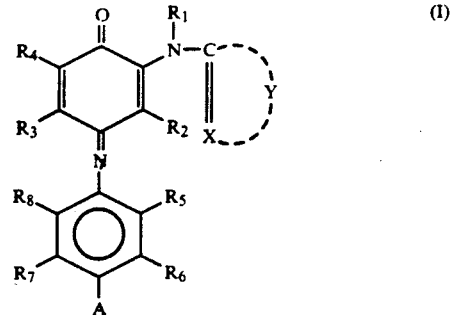

wherein $R_1$ represents a hydrogen atom or an alkyl group; $R_2$ to $R_8$ each represent a hydrogen atom, an alkyl group, an alkoxy group, a halogen atom, an acylamino group, an alkoxycarbonyl group, a cyano group, an alkoxycarbonylamino group, an aminocarbonylamino group, a sulfonylamino group, a carbamoyl group, a sulfamoyl group or an acyl group; A represents

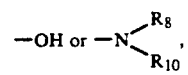

wherein $R_9$ and $R_{10}$, which may be the same or different, each represents a hydrogen atom, an alkyl group or an aryl group; X represents a nitrogen atom or

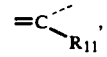

$R_{11}$ representing a hydrogen atom, an alkyl group or an aryl group; Y represents a non-metallic atomic group necessary for forming a 5-membered to 7-membered ring; and $R_3$ and $R_4$ may optionally be bonded to each other to form a ring; and $R_6$ and $R_9$, and/or $R_9$ and $R_{10}$, and/or $R_7$ and $R_{10}$ may optionally be bonded to each other to form a ring. The transferred image from the material has an excellent light-fastness.

11 Claims, No Drawings

THERMAL TRANSFER DYE DONATING MATERIAL

FIELD OF THE INVENTION

The present invention relates to a thermal transfer dye donating material.

BACKGROUND OF THE INVENTION

A thermal transfer process, an electrophotographic process, an ink jet; process and the like have been investigated energetically as techniques relating to color hard copies. A thermal transfer process has many advantageous merits as compared with other processes, since the maintenance and operation of the apparatus for the process are easy and the apparatus as well as corresponding supplies are low-priced.

Such a thermal transfer process includes a system where a thermal transfer dye donating material composed of a base film and a hot-melt ink layer formed thereon is heated with a thermal head so as to melt the ink. The molten ink is transferred to a thermal transfer image-receiving material to thereby form an image thereon. A system where a thermal transfer dye donating material composed of a base film and a thermotransferring dye-containing dye donating layer formed thereon is heated with a thermal head so as to transfer the dye under heat to a thermal transfer image-receiving material to form an image.

The latter thermotransfer system is especially advantageous for the recording of full-color images with high quality, since the amount of the dye to be transferred may easily be controlled by varying the amount of the energy to be applied to the thermal head so that recording of images with gradation is possible. However, as thermotransferring dyes usable in the system are much limited, and few dyes which satisfy all the necessary requirements are known.

Therefore, the necessary requirements for the dyes usable in the system are, for example, a spectral characteristic favorable to color reproduction, easy transfer under heat, resistance to light and heat, resistance to various chemicals, a property such that the sharpness of the dye hardly lowers after it has been transferred under heat to an image-receiving material, and freedom from re-transfer of the once transferred image. Further, a thermal transfer dye donating material containing the dye is required to be produced easily. Accordingly, development of cyan dyes capable of satisfying such requirements is desired.

Various thermal transfer cyan dyes have heretofore been proposed, and indoaniline dyes are considered comprehensively favorable above all. In particular, indoaniline dyes described in JP-A-61-31292, 61-35994 and 61-49893 are known to have excellent properties. (The term "JP-A" as used herein means an "unexamined published Japanese patent application".) However, even these dyes have the serious defect that the transferred images to be obtained still have a poor light-fastness.

SUMMARY OF THE INVENTION

The objects and advantages of the present invention include providing a thermal transfer dye donating material containing a cyan dye which is free from the above and other defects.

The above and other objects and advantages of the invention have been attained by a thermal transfer dye donating material, which comprises a support having thereon a dye donating layer comprising a dye represented by formula (I):

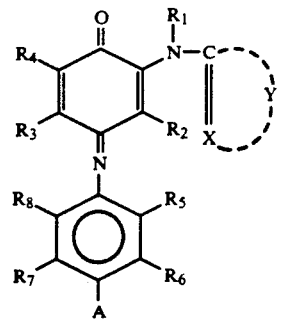

wherein $R_1$ represents a hydrogen atom or an alkyl group; $R_2$ to $R_8$, which may be the same or different, each represent a hydrogen atom, an alkyl group, an alkoxy group, a halogen atom, an acylamino group, an alkoxycarbonyl group, a cyano group, an alkoxycarbonylamino group, an aminocarbonylamino group, a sulfonylamino group, a carbamoyl group, a sulfamoyl group or an acyl group; A represents

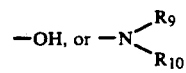

(wherein $R_9$ and $R_{10}$, which may be the same or different, each represent a hydrogen atom, an alkyl group or an aryl group); X represents a nitrogen atom or

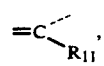

$R_{11}$ representing a hydrogen atom, an alkyl group or an aryl group; Y represents a non-metallic atomic group necessary for forming a 5-membered to 7-membered ring; and $R_3$ and $R_4$ may optionally be bonded to each other to form a ring, and any or all of the group $R_6$ and $R_9$, $R_9$ and $R_{10}$ and $R_7$ and $R_{10}$ may optionally be bonded to each other to form a ring.

DETAILED DESCRIPTION OF THE INVENTION

Dyes of formula (I) will be explained in more detail below.

$R_1$ represents a hydrogen atom or an alkyl group (preferably having from 1 to 10 carbon atoms, such as methyl, ethyl, propyl, isopropyl, t-butyl).

$R_2$ to $R_8$ each independently represents a hydrogen atom; an alkyl group (preferably having from 1 to 10 carbon atoms, such as methyl, ethyl, propyl, isopropyl, t-butyl); an alkoxy group (preferably having from 1 to 10 carbon atoms, such as methoxy, ethoxy, propoxy, isopropoxy; any of which may optionally be substituted); a halogen atom (for example, fluorine, chlorine, bromine); an acylamino group (preferably, an alkylcarbonylamino group which has from 1 to 10 carbon atoms and which may optionally be substituted, such as formylamino, acetylamino, propionylamino, isobutyrylamino, hexahydrobenzoylamino, pivaloylamino, trifluoroacetylamino, heptafluorobutyrylamino, chloropropionylamino, amino, cyanoacetylamino, phenoxyacetylamino; a vinylcarbonylamino group which has from 3 to 10 carbon atoms and which may optionally be substituted, such as acryloylamino, methacryloylamino, crotonoylamino; an arylcarbonylamino group which has from 7 to 15 carbon atoms and which may optionally be substituted, such as benzoylamino, p-toluylamino, pentafluorobenzoylamino, o-fluorobenzoylamino, m-methoxybenzoylamino, p-trifluoromethylbenzoylamino, 2,4-dichlorobenzoylamino, p-methoxy-carbonylbenzoylamino, 1-naphthoylamino; a heterocycliccarbonylamino group which has from 5 to 13 carbon atoms and which may optionally be substituted, such as piconoylamino, nicotinoylamino, pyrrol-2-carbonylamino, thiophene-2-carbonylamino, furoylamino, piperidine-4-carbonylamino); an alkoxycarbonyl group (preferably, having from 2 to 10 carbon atoms and which may optionally be substituted, such as methoxycarbonyl, ethoxycarbonyl); a cyano group, an alkoxycarbonylamino group (preferably, having from 2 to 10 carbon atoms and which may optionally be substituted, such as methoxycarbonylamino, ethoxycarbonylamino, isopropoxycarbonylamino, methoxyethoxycarbonylamino, N-methylmethoxycarbonylamino); an aminocarbonylamino group (preferably, having from 1 to 10 carbon atoms and which may optionally be substituted, such as methylaminocarbonylamino, dimethylaminocarbonylamino, butylaminocarbonylamino); a sulfonylamino group (preferably having from 1 to 10 carbon atoms, such as methanesulfonylamino, ethanesulfonylamino, N-methylmethanesulfonylamino, phenylsulfonylamino); a carbamoyl group (for example, an alkylcarbamoyl group which has from 1 to 12 carbon atoms and which may optionally be substituted, such as methylcarbamoyl, dimethylcarbamoyl, butylcarbamoyl, isopropylcarbamoyl, t-butylcarbamoyl, cyclopentylcarbamoyl, cyclohexylcarbamoyl, allylcarbamoyl, methoxyethylcarbamoyl, chloroethylcarbamoyl, cyanoethylcarbamoyl, ethylcyanoethylcarbamoyl, benzylcarbamoyl, ethoxycarbonylmethylcarbamoyl, furfurylcarbamoyl, tetrahydrofurfurylcarbamoyl, phenoxydimethylcarbamoyl; an arylcarbamoyl group which has from 7 to 15 carbon atoms and which may optionally be substituted, such as phenylcarbamoyl, p-toluylcarbamoyl, m-methoxyphenylcarbamoyl, 4,5-dichlorophenylcarbamoyl, p-cyanophenylcarbamoyl, p-acetylaminophenylcarbamoyl, p-methoxycarbonylphenylcarbamoyl, m-trifluoromethylphenylcarbamoyl, o-fluorophenylcarbamoyl, 1-naphthylcarbamoyl; a heterocycliccarbamoyl group which has from 4 to 12 carbon atoms and which may optionally be substituted, such as 2-pyridylcarbamoyl, 3-pyridylcarbamoyl, 4-pyridylcarbamoyl, 2-thiazolylcarbamoyl, 2-benzothiazolylcarbamoyl, 2-benzimidazolylcarbamoyl, 2-(4-methyl)-pyridylcarbamoyl, 2-(5-methyl)-1,3,4-thiadiazolylcarbamoyl); a sulfamoyl group (preferably having from 0 to 12 carbon atoms, such as methylsulfamoyl, dimethylsulfamoyl, butylsulfamoyl, phenylsulfamoyl); or an acyl group (preferably, an alkylcarbonyl group which has from 1 to 10 carbon atoms and which may optionally be substituted, such as formyl, acetyl, propionyl, hexahydrobenzoyl, pivaloyl, trifluoroacetyl, heptafluorobutyryl, chloropropionyl, cyanoacetyl, phenoxyacetyl; a vinylcarbonyl group which has from 3 to 10 carbon atoms and which may optionally be substituted, such as acryloyl, methacryloyl, crotonoyl; an arylcarbonyl group which has from 7 to 15 carbon atoms and which may optionally be substituted, such as benzoyl, p-toluyl, pentafluorobenzoyl, o-fluorobenzoyl, m-methoxybenzoyl, p-trifluoromethylbenzoyl, 2,4-dichlorobenzoyl, p-methoxycarbonylbenzoyl, 1-naphthoyl).

$R_9$ and $R_{10}$ each independently represent a hydrogen atom, an alkyl group (preferably having from 1 to 12 carbon atoms and which may optionally be substituted, such as methyl, ethyl, isopropyl, butyl, cyclopentyl, cyclohexyl, 2-methoxyethyl, 2-chloroethyl, 2-hydroxyethyl, 2-cyanoethyl, cyanomethyl, 2-methylsulfamoyl, 2-methylsulfonylaminoethyl, 2-methoxycarbonylethyl, 2-acetoxyethyl, methoxycarbonylmethyl, benzyl, allyl), or an aryl group (preferably having from 6 to 12 carbon atoms, such as phenyl, p-tolyl, m-chlorophenyl).

X represents a nitrogen atom (=N...) or a group of

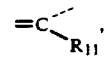

in which $R_{11}$ represents a hydrogen atom, an alkyl group (preferably having from 1 to 10 carbon atoms and which may optionally be substituted, such as methyl, ethyl, propyl), or an aryl group (preferably having from 6 to 12 carbon atoms and which may optionally be substituted, such as phenyl, p-tolyl).

Y represents a non-metallic atomic group necessary for forming a 5-membered to 7-membered ring. Examples of such a hetero ring to be formed by Y include a pyrrole ring, a pyridine ring, a pyrazole ring, an imidazole ring, a 1,2,3-triazole ring, a 1,2,4-triazole ring, a tetrazole ring, a pyrimidine ring, a dihydropyrimidine ring, an oxazine ring, a pyrazine ring, a pyridazine ring, an oxazole ring, an isoxazole ring, a thiazole ring, a dihydrothiazole ring, a 2-thiazolone ring, a triazine ring, and a thiadiazole ring. These hetero rings may optionally be substituted, or they may form condensed rings with carbon ring(s) (e.g., benzene ring) and/or additional hetero ring(s). Examples of substituents which may be on the 5-membered to 7-membered ring to be formed by Y include an alkyl group (having the same meaning as the alkyl group of $R_1$), an alkoxy group (having the same meaning as the alkoxy group of $R_2$ to $R_8$), a halogen atom (e.g., F, Cl, Br), a nitro group, an aryl group (having the same meaning as the aryl group of $R_9$ and $R_{10}$), an alkylthio group (for example, having from 1 to 10 carbon atoms and which may optionally be substituted one, such as methylthio, ethylthio, pentylthio, decylthio), an aryloxy group (for example, having from 6 to 12 carbon atoms and which may optionally be substituted, such as phenoxy, p-methylphenoxy), an amino group (—NH₂), a substituted amino group (for example, having from 1 to 12 carbon atoms, such as methylamino, ethylamino, propylamino, phenylamino, 2,4-di-t-butyl-p-hydroxyphenylamino, morpholino), and an alkoxycarbonyl group (for example, having from 1 to 10 carbon atoms and which may optionally substituted, such as methoxycarbonyl, ethoxycarbonyl).

Preferably, $R_1$, $R_2$, $R_6$, $R_7$, $R_8$ and $R_{11}$ are hydrogen atoms; $R_3$ is an alkyl group having from 1 to 4 carbon atoms, or an alkylcarbonylamino or arylcarbonylamino group having from 2 to 10 carbon atoms; and $R_4$ is a chlorine atom or a hydrogen atom. The ring to be formed by $R_3$ and $R_4$ is preferably

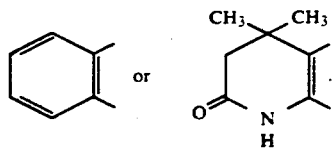

$R_5$ is preferably a hydrogen atom, an alkyl group having from 1 to 3 carbon atoms, an alkoxy group having from 1 to 3 carbon atoms, an acylamino group having from 1 to 4 carbon atoms, or an alkoxycarbonylamino group having from 1 to 4 carbon atoms. $R_9$ and $R_{10}$ each are preferably an alkyl group having from 2 to 7 carbon atoms.

The rings to be formed by $R_6$ and $R_9$, and/or $R_9$ and $R_{10}$, and/or $R_7$ and $R_{10}$ are preferably

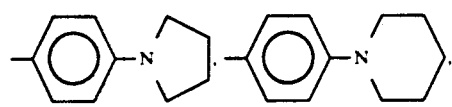

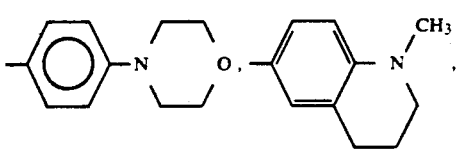

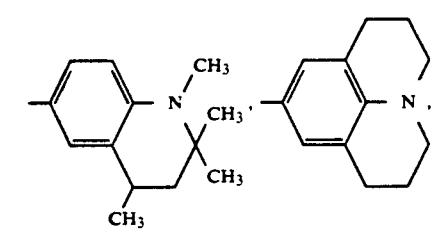

X is preferably a nitrogen atom. The hetero ring to be formed by Y is preferably an s-triazine ring.

Specific examples of dyes of formula (I) suitable for use in the present invention are mentioned below, which, however, are not limitative.

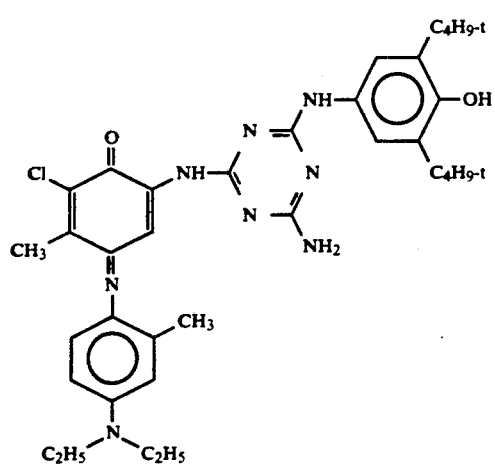
1

-continued

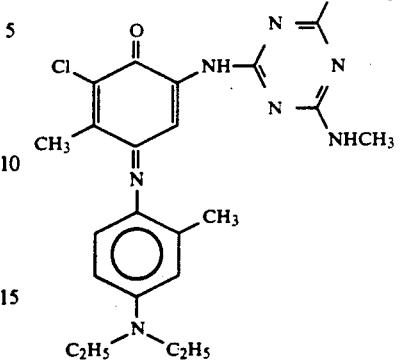
2

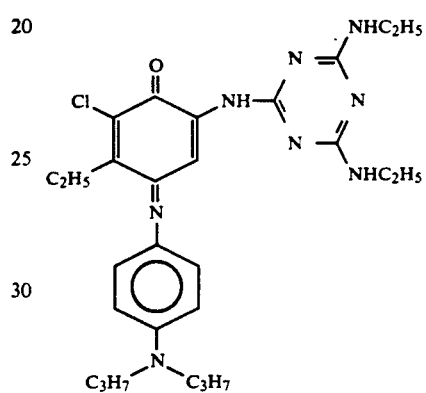
3

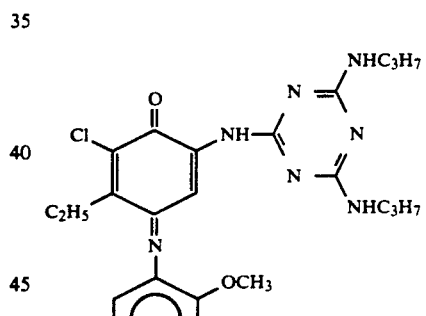
4

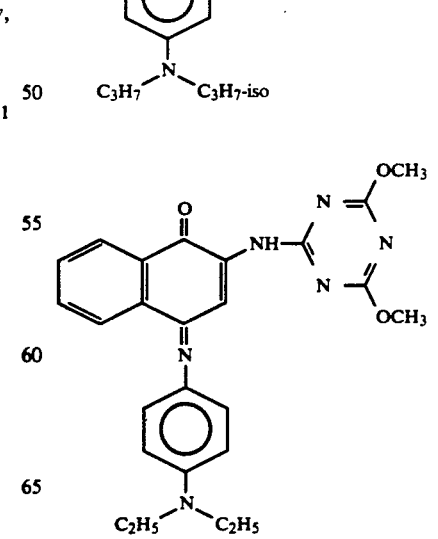
5

-continued
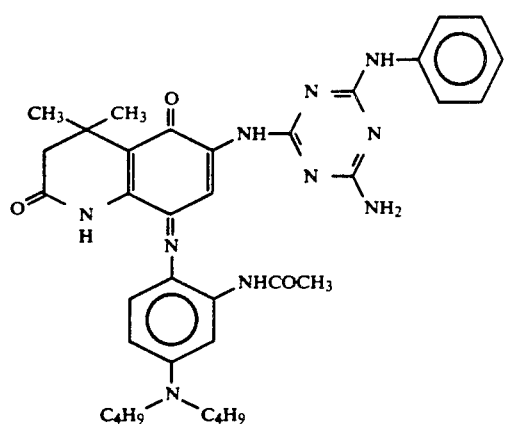
6
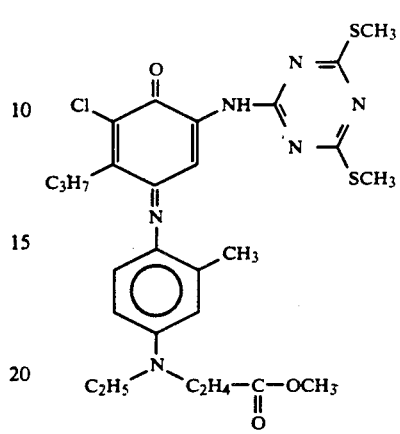
9
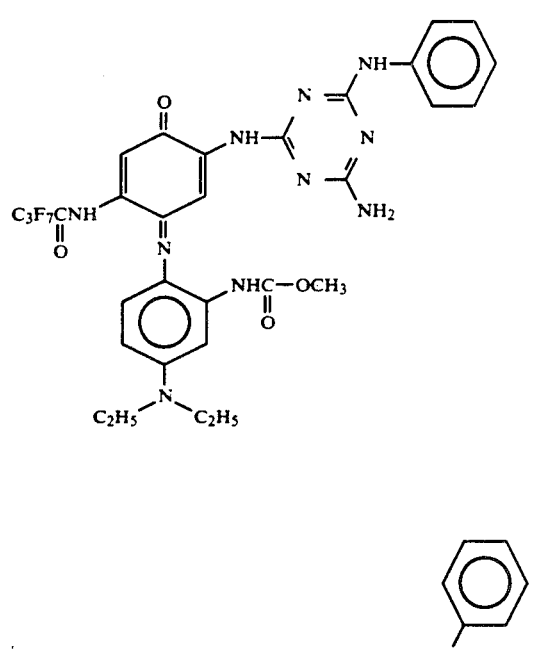
7
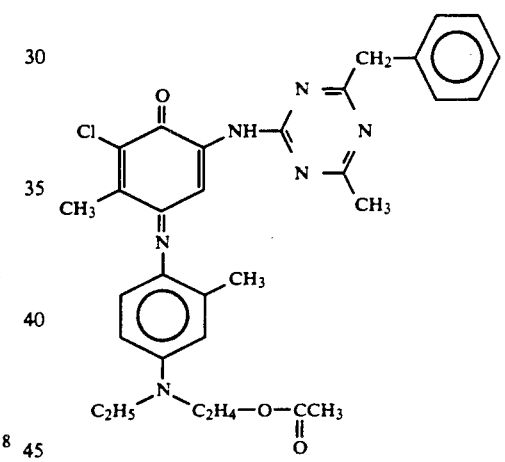
10
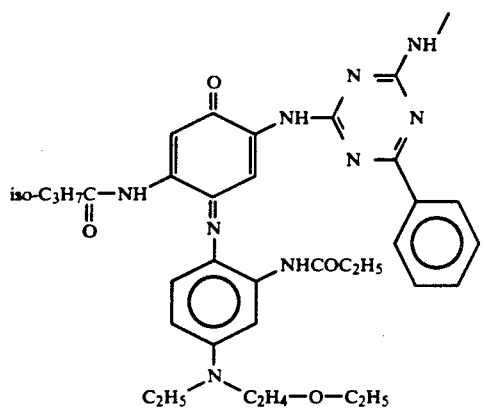
8
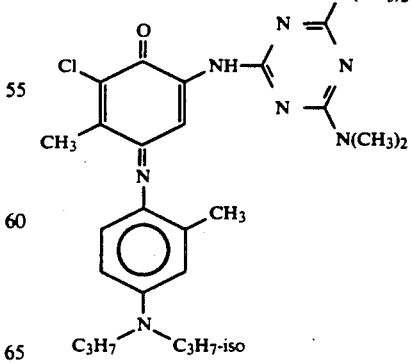
11

-continued
12
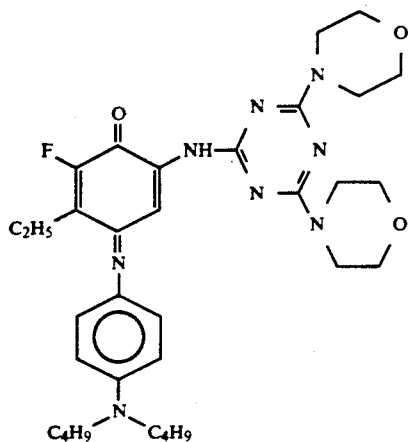
13
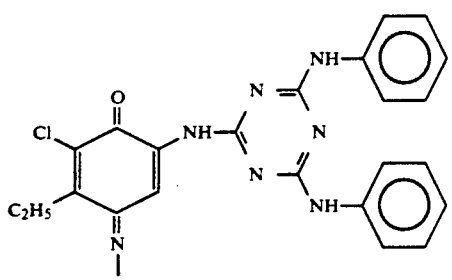
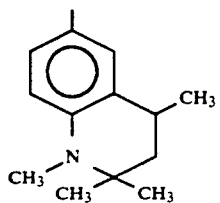
14
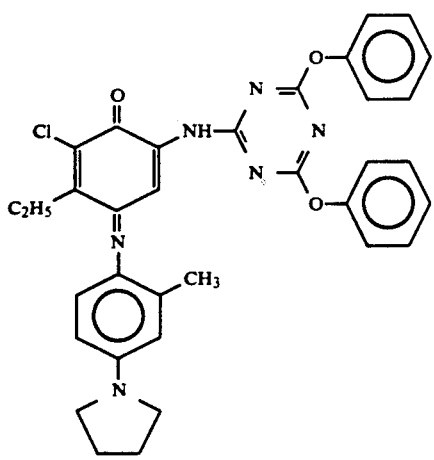
-continued
15
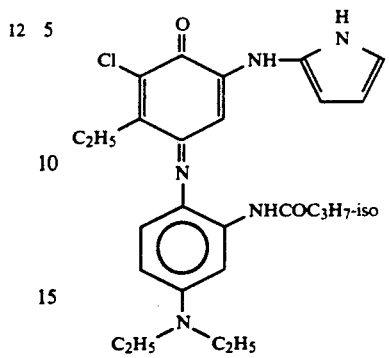
16
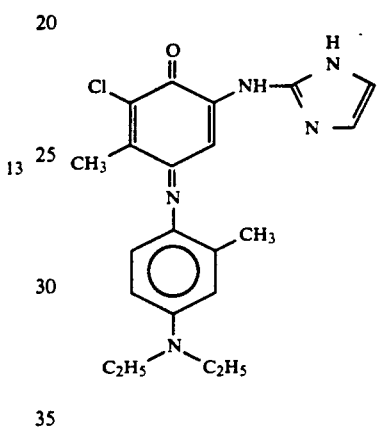
17
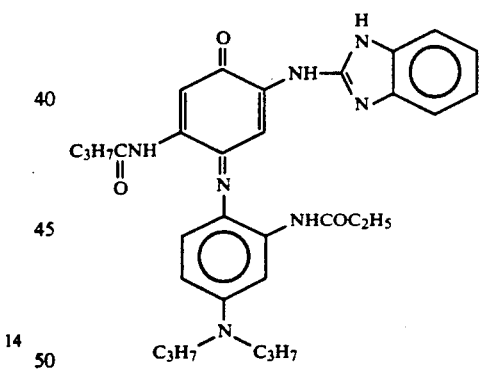
18
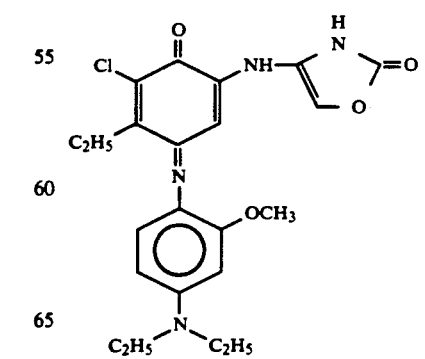

19
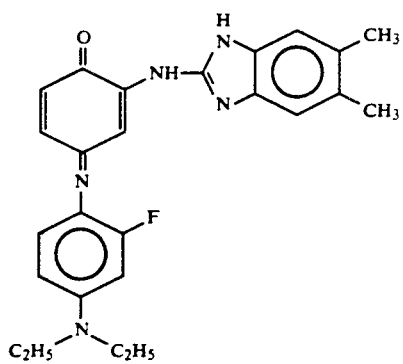
23
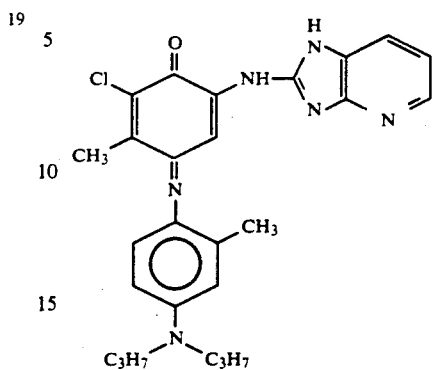
20
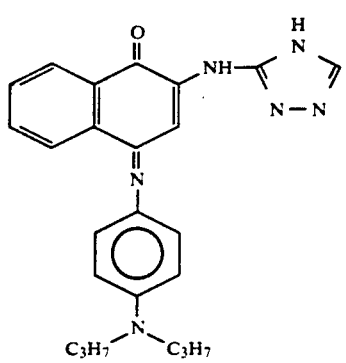
24
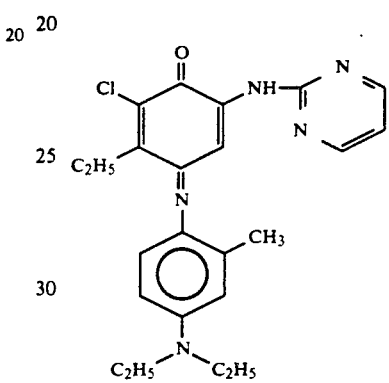
21
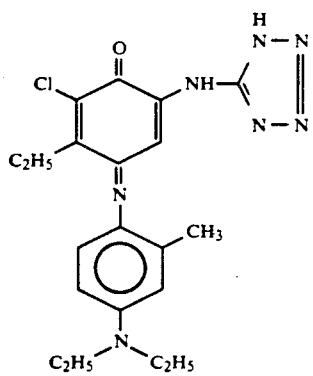
25
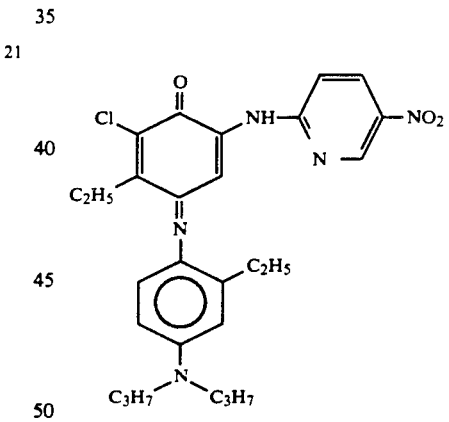
22
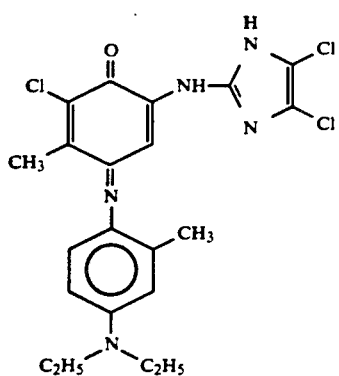
26
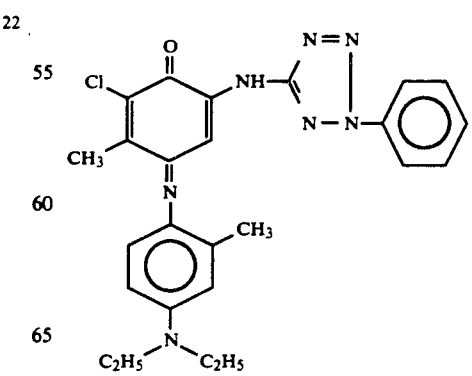

-continued
27 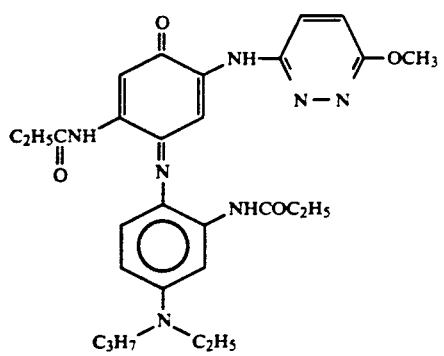
28 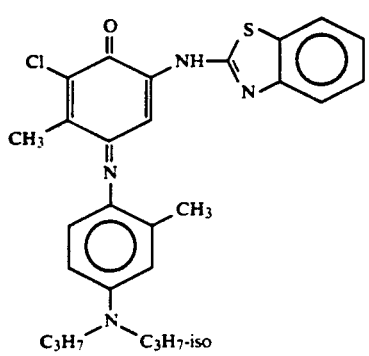
29 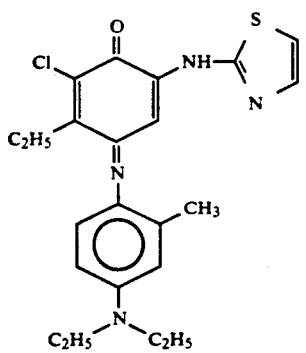
30 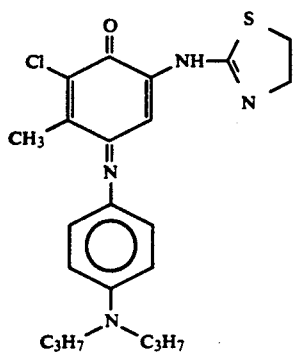
-continued
31 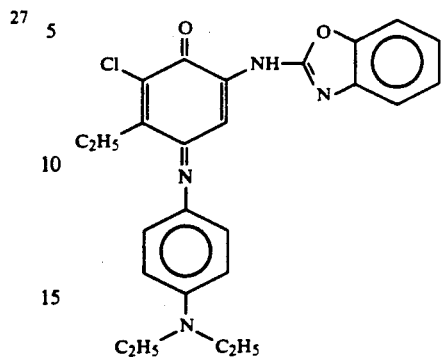
32 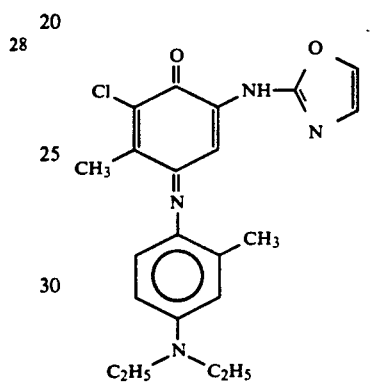
33
34

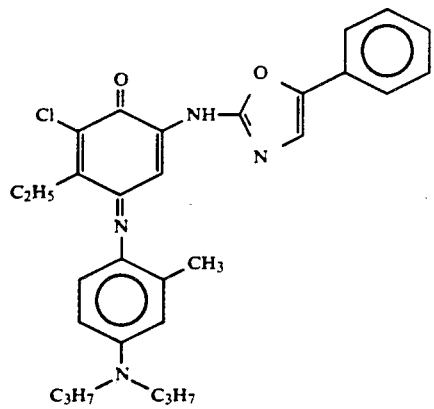
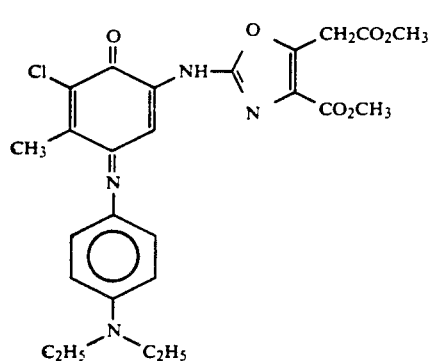
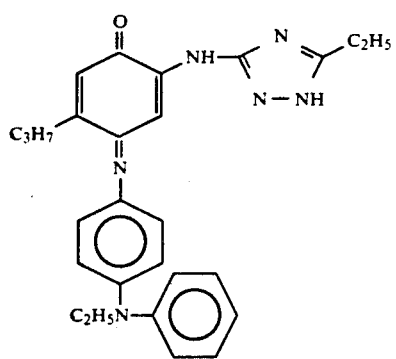
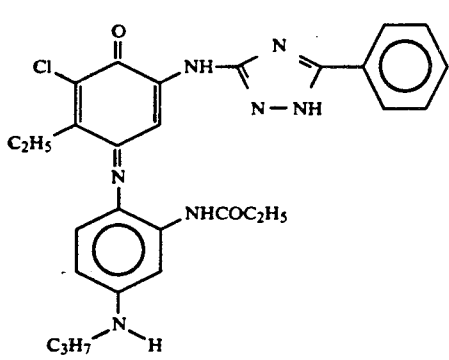
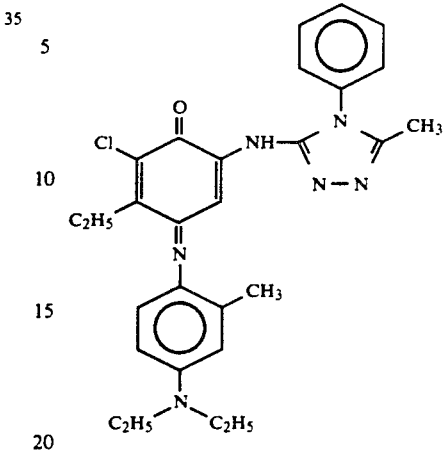
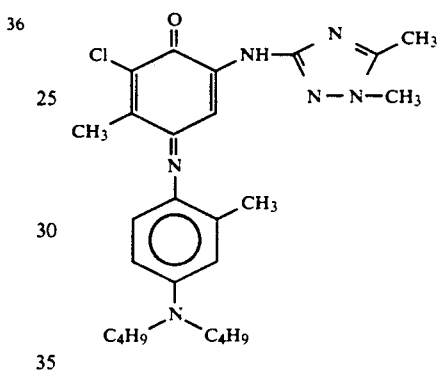
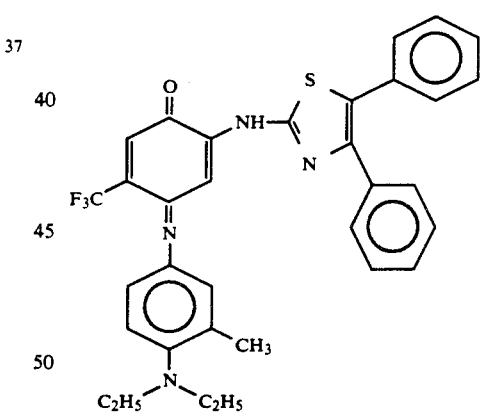
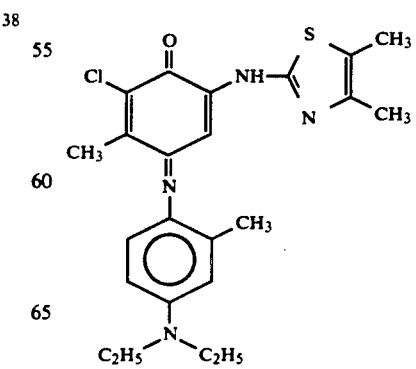

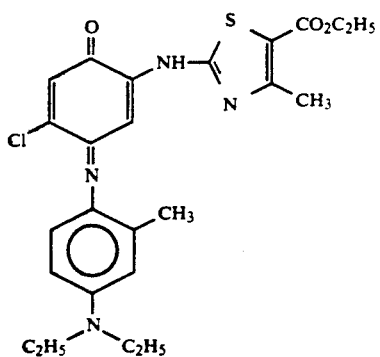
43
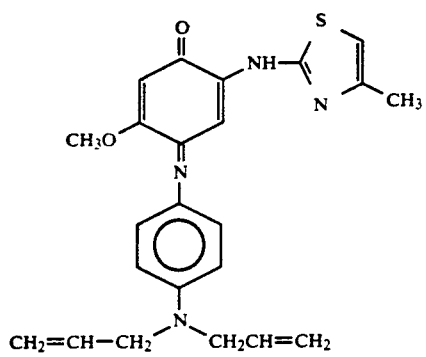
44
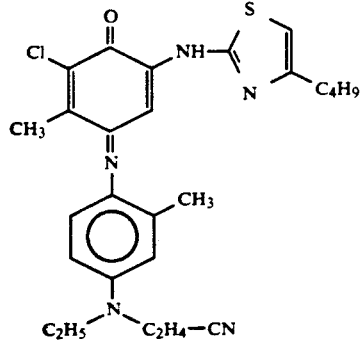
45
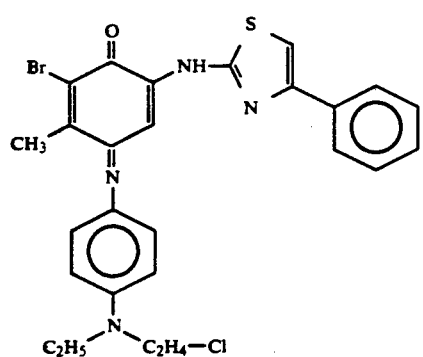
46
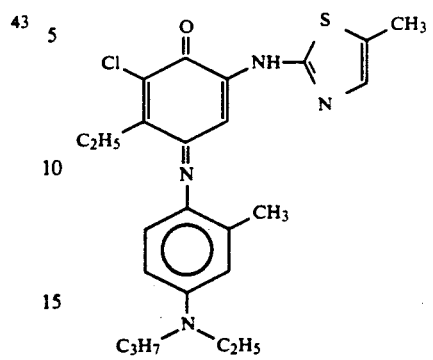
47
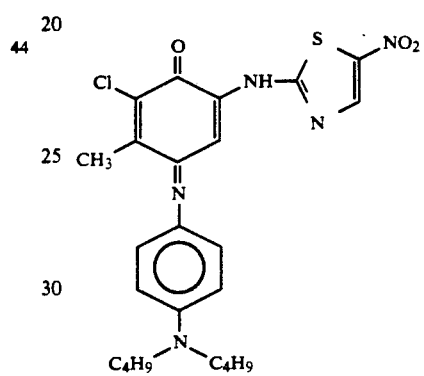
48
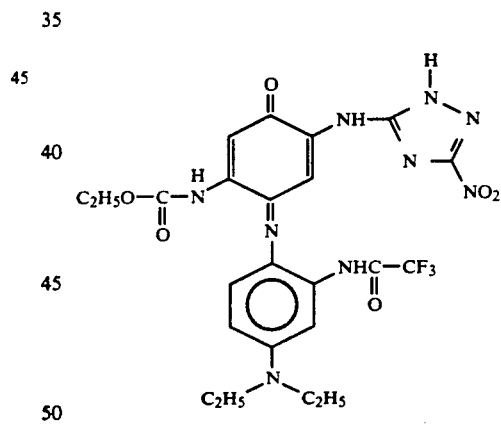
49
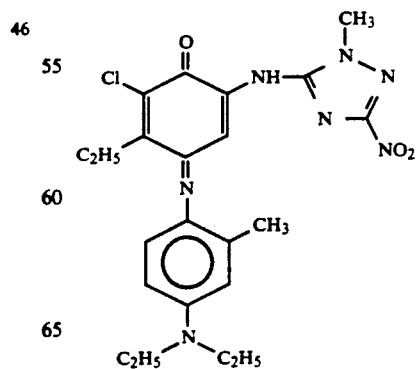
50

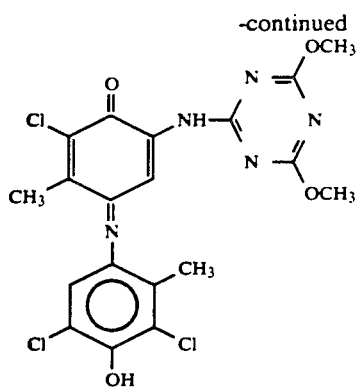

51

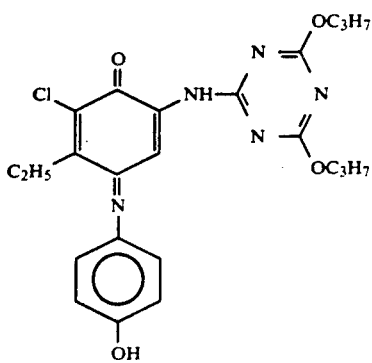

52

Dyes of formula (I) of the invention may be produced by known methods, for example, by reacting a coupler moiety (A) which is produced by the following known method and a color-developing agent moiety (B) or (C) of a known compound, by oxidative coupling.

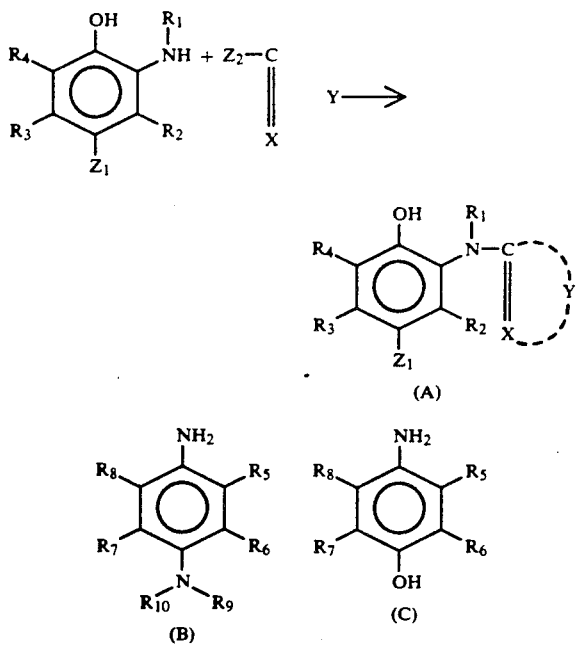

In these formulae, $R_1$ to $R_{10}$, X and Y have the same meanings as those in formula (I); $Z_1$ represents a hydrogen atom or a coupling split-off group; and $R_2$ represents a group capable of being split off by attack of a nucleophilic agent, preferably a halogen atom.

One example of producing a dye of formula (I) is mentioned below.

1. Production of Dye No. 1:

(1) Production of 2-amino-4-(3,5-dichloro-2-hydroxy-4-methylphenylamino)-6-(4-hydroxy-3,5-di-tert-butylphenylamino)-s-triazine:

A mixture comprising 2.3 g of 3,5-dichloro-2-hydroxy-4-methylaniline hydrochloride and 100 ml of dimethylformamide was stirred in a nitrogen stream, 14 g of potassium carbonate was added thereto, and subsequently 3.4 g of 2-amino-4-chloro-6-(4-hydroxy-3,5-di-tert-butylphenylamino)triazine was added thereto and heated at 90° C. for 6 hours with stirring. After the reaction mixture was cooled to room temperature, the solid content was taken out by filtration, poured into ice-water and then extracted with ethyl acetate. The resulting extract was washed twice with a saturated saline solution and then dried with magnesium sulfate anhydride to concentrate the solvent. The viscous liquid thus obtained was purified by silica gel column chromatography to obtain 1.6 g of the intended product.

(2) Production of Dye No. 1:

A mixture comprising 1.6 g of 2-amino-4-(3,5-dichloro-2-hydroxy-4-methylphenylamino)-6-(4-hydroxy-3,5-di-tert-butylphenylamino)triazine, 30 ml of ethyl acetate and 25 ml of ethanol was stirred. 25 ml of an aqueous solution of 2.8 g of sodium carbonate was added thereto, 1.5 g of 4-(N,N-diethylamino)-2-methylaniline sulfate was added thereto, and 25 ml of an aqueous solution of 2.2 g of ammonium peroxodisulfate was dropwise added thereto over a period of 30 minutes.

After stirring was performed for 2 hours at room temperature, the resulting reaction mixture was poured into water and then extracted with ethyl acetate. After neutralization was performed with a diluted hydrochloric acid, the resulting extract was washed twice with a saturated saline solution and then dried with magnesium sulfate anhydride to concentrate the solvent. This was purified by silicagel column chromatography to obtain 1.0 g of a dark blue solid of the intended product of Dye No. 1.

The thermal transfer dye donating material of the present invention comprises the cyan dye of formula (I) contained in a dye donating layer on a support. The amount of the cyan dye is generally from 0.03 to 1 g/m², preferably from 0.1 to 0.6 g/m². If desired, other thermotransferring dyes having different color hues from those of the above-mentioned dyes of formula (I) may be used in the present invention to provide yellow, magenta and cyan dyes on the support. The thermal transfer dye donating material of the present invention may be in the form of either a sheet or a roll or ribbon.

In general, these respective yellow, magenta and cyan dyes are arranged on a support to separately form independent regions. For instance, a yellow dye region, a magenta dye region and a cyan dye region are positioned on a support either in plane order or in line order. As the case may be, a thermotransferring black dye region may optionally be provided on a support in addition to these regions.

Such yellow dye, magenta dye and cyan dye may be dissolved or dispersed in a pertinent solvent along with a binder resin and then coated on a support to form the dye donating layer, or alternatively, the resulting solution or dispersion may be printed on a support, for example, by gravure printing. The thickness of the dye donating layer is generally from about 0.2 μm to about 5 μm, preferably from 0.4 μm to 2 μm, as a dry thickness.

As the binder resin to be used along with the above-mentioned dyes for the purpose, any known binder resins are suitable. In general, those which have a high heat-resistance and which do not interfere with transfer of dyes under heat are selected. For instance, examples of usable binder resins include polyamide resins, polyester resins, epoxy resins, polyurethane resins, polyacrylic resins (for example, polymethyl methacrylate, polyacrylamide, polystyrene-2-acrylonitrile), vinyl resins (for example, polyvinyl pyrrolidone), polyvinyl resins (for example, vinyl chloride-vinyl acetate copolymer), polycarbonate resins, polystyrenes, polyphenylene oxides, cellulose resins (for example, methyl cellulose, ethyl cellulose, carboxymethyl cellulose, cellulose acetate hydrogen phthalate, cellulose acetate, cellulose acetate propionate, cellulose acetate butyrate, cellulose triacetate), polyvinyl alcohol resins (for example, polyvinyl alcohol, and partially saponified polyvinyl alcohols such as polyvinyl acetal and polyvinyl butyral), petroleum resins, rosin derivatives, chromanindene resins, terpene resins, and polyolefin resins (for example, polyethylene, polypropylene).

The amount of the binder resin to be used is preferably from about 20 to 600 parts, more preferably from 80 to 200 parts, by weight to 100 parts by weight of dye.

An ink solvent, which may be any known one, is used for dissolving or dispersing the above-mentioned dyes and binder resins, in the present invention.

The dye to be used in the dye donating layer is suitably selected in order that a desired color hue can be transferred by printing. If desired, two or more dye donating layers each having a different dye can be formed on a support of one dye donating material, by putting them side by side thereon. For instance, where a color image, such as a color photographic image, is formed by repeated printing of plural colors in accordance with a color separating signal, the printed image is desired to have cyan, magenta and yellow color hues. Accordingly, in this case, three dye donating layers each containing one of the dyes capable of giving such color hues are put in a desired order on a support. As the case may be, a dye donating layer containing a black color hue-giving dye may further be formed on the same support, in addition to such cyan, magenta and yellow dyes. Where such plural dye donating layers are formed on a support, it is recommended to provide a position detecting mark along with any of the plural dye donating layers. By provision of such a mark, any ink other than those for forming the dye donating layers or any additional printing step may be omitted.

Known supports for the thermal transfer dye donating material of the present invention, any known ones can be used. For instance, suitable supports include polyethylene terephthalate, polyamides, polycarbonates, glassine paper, condenser paper, cellulose esters, fluorine polymers, polyethers, polyacetals, polyolefins, polyimides, polyphenylenesulfide, polypropylene, polysulfone, and cellophane.

The thickness of the support of the thermal transfer dye donating material of the present invention is generally from about 2 to about 30 μm. If desired, the support may have a subbing layer provided thereon. Also, if desired, a dye diffusion-preventing layer comprising a hydrophilic polymer may be provided between the support and the dye donating layer. By provision of such a dye diffusion-preventing layer, the density of the transferred dye may be elevated further. As the hydrophilic polymer suitable for forming the layer, the above-mentioned water-soluble polymers can be used.

For the purpose of preventing a thermal head from sticking to the surface of the dye donating material, a slipping layer may be provided. Such a slipping layer may comprise a lubricating substance containing or not containing a polymer binder, for example, a surfactant or a solid or liquid lubricant or a mixture of them.

It is recommended that the dye donating material is subjected to sticking preventing treatment on the surface of the support not coated with the dye donating layer. This treatment prevents the material from sticking to a thermal head due to the heat of the head in the printing process where a heated thermal head is applied to the material from the back surface thereof, and improves the slidability of a thermal head on the surface of the material.

For instance, a heat-resistant slip layer consisting essentially of (1) a reaction product of a polyvinyl butyral resin and an isocyanate, (2) an alkali metal or alkaline earth metal salt of a phosphate and (3) a filler, may be provided on the intended surface of the support for the purpose. Preferred polyvinyl butyral resins are those having a molecular weight of approximately from 60,000 to 200,000 and a glass transition point of approximately from 80° to 110° C. and as well as those having a proportion of the vinyl butyral moiety of approximately from 15 to 40% by weight of the total weight of the resin in view of the sufficient number of the reaction sites reactive with isocyanates. An example of alkali metal or alkaline earth metal salts of phosphates includes Gafac RD720 (product by Toho Chemical Co.). The content of such a salt may be from 1 to 50% by weight, preferably from 10 to 40% by weight, to the polyvinyl butyral resin.

It is desired that the heat-resistant slip layer has a heat-resistant layer below the slip layer. The heat-resistant layer may comprise a combination of a thermosetting synthetic resin and a hardening agent for the resin, for example, a combination of a polyvinyl butyral and a polyisocyanate, a combination of an acrylpolyol and a polyisocyanate, a combination of a cellulose acetate and a titanium chelating agent and a combination of a polyester and an organic titanium compound.

The dye donating material of the present invention may have a hydrophilic barrier layer for the purpose of preventing diffusion of dyes in the direction of the support. Such a hydrophilic dye-barrier layer contains a hydrophilic substance useful for the intended purpose. In general, excellent results are obtained by employment of gelatin, poly(acrylamide), poly(isopropylacrylamide), butyl methacrylate-grafted gelatin, ethyl methacrylate-grafted gelatin, cellulose monoacetate, methyl cellulose, poly(vinyl alcohol), poly(ethyleneimine), poly(acrylic acid), mixture of poly(vinyl alcohol) and poly(vinyl acetate), mixture of poly(vinyl alcohol) and poly(acrylic acid), or mixture of cellulose monoacetate and poly(acrylic acid). Especially preferred is poly(acrylic acid), cellulose monoacetate or poly(vinyl alcohol).

The dye donating material of the present invention may have a subbing layer. Any subbing layer having the desired activity may be employed in the present invention. Preferred examples include acrylonitrile/vinylidene chloride/acrylic acid copolymer (14/80/6, by weight), butyl acrylilate/methacrylic acid /2-aminoethyl methacrylate-2-hydroxyethyl copolymer (30/20/50, by weight), linear saturated polyesters such as Bostic 7650 (product by M Heart Co. of Bostic Chemical Group), and chlorinated high-density poly-(ethylene-trichloroethylene) resins. The amount of the subbing layer to be coated is not specifically limited but may be, in general, from about 0.1 to about 2.0 g/m$^2$.

The thermal transfer dye donating material of the present invention is attached to a thermal transfer image receiving material. Heat energy is imparted to either of the attached materials, preferably to the back surface of the thermal transfer dye donating material by a heating means, for example, with a thermal head or the like in accordance with any desired image information, so that the dye in the dye donating layer may be transferred to the thermal transfer image receiving material in accordance with the degree of the heat energy imparted to the attached materials. As a result, a color image having high sharpness and sufficient gradation with good resolution can be formed on the image receiving material.

The heating means to be employed in the image formation is not limited to such a thermal head, but any other known means such as laser ray (for example, semi-conductor laser ray), infrared flash, hot pen and others may also be used.

As noted, the thermal transfer dye donating material of the present invention is combined with a thermal transfer image receiving material, and can be used in various fields of printing and facsimile applications using various thermal printing systems, formation of image prints by magnetic recording system, photomagnetic recording system or optical recording system, and formation of print images from television or CRT image plane.

Examples of these thermal transfer recording methods are disclosed in JP-A-60-34895.

The thermal transfer image receiving material to be used in combination with the thermal transfer dye donating material of the present invention is one having an image receiving layer on a support, which is the layer receiving the dye transferred from the thermal transfer dye donating material. The image receiving layer preferably contains a substance capable of receiving the dyes as transferred from the thermal transfer dye donating material during printing and capable of fixing the thus transferred dyes in the layer, singly or along with any other binder substance. The layer preferably has a thickness of approximately from 0.5 to 50 μm. Specific examples of substances which may comprise such an image receiving layer for receiving dyes transferred from the thermal transfer dye donating material include polymers of the following resins.

(A) Resins having ester bonds:

Polyester resins to be obtained by condensation of a dicarboxylic acid component such as terephthalic acid, isophthalic acid or succinic acid (the dicarboxylic acid component may have a sulfone group, a carboxyl group or the like) and ethylene glycol, diethylene glycol, propylene glycol, neopentyl glycol, bisphenol A or the like; polyacrylate resins or polymethacrylate resins such as polymethyl methacrylate, polyvinyl methacrylate, polymethyl acrylate or polybutyl acrylate; polycarbonate resins; polyvinyl acetate resins; styrene-acrylate resins; and vinyltoluene-acrylate resins. Specific examples are described in JP-A-59-101395, 63-7971, 63-7972, 63-7973 and 60-294862. As commercial products, usable are Vylon 290, Vylon 200, Vylon 280, Vylon 300, Vylon 103, Vylon GK-140 and Vylon GK-130 (all products by Toyo Spinning Co.) and ATR-2009 and ATR-2010 (both products by Kao Co.).

(B) Resins having urethane bonds:
Polyurethane resins.

(C) Resins having amido bonds:
Polyamide resins.

(D) Resins having urea bonds:
Urea resins.

(E) Resins having sulfone bonds:
Polysulfone resins.

(F) Other resins having high polar bonds:
Polycaprolactone resins, styrene-maleic anhydride resins, polyvinyl chloride resins, and polyacrylonitrile resins.

Among them, resins having ester bonds are preferable.

In addition to the above-mentioned resins, mixtures of resins as well as copolymers of resins may also be used.

The thermal transfer image receiving material may contain, especially in the image receiving layer, a high boiling point organic solvent or a thermal solvent as a substance capable of accepting the dye as transferred from the thermal transfer dye donating material of the present invention or as a promoter for diffusion of the dye.

Examples of a high boiling organic solvents and a thermal solvent to be used for this purpose are compounds described in JP-A-62-174754, 62-245253, 61-209444, 61-200538, 62-8145, 62-9348, 62-30247, and 62-136646.

The image receiving layer of the thermal transfer image receiving material may contain a substance capable of accepting the transferred dye in the form of a dispersion as dispersed in a water-soluble binder. The water-soluble binder may be any known water-soluble polymer. Preferred are water-soluble polymers having groups capable of being crosslinked with a hardening agent.

The image receiving layer may be composed of two or more layers. In this case, it is desired that the layer nearer to the support comprises a synthetic resin having a lower glass transition point or containing a high boiling point organic solvent or a thermal solvent for the purpose of elevating the fixability of the transferred dye in the layer. The outermost layer comprises a synthetic resin having a higher glass transition point and contains a minimum amount of a high boiling point organic solvent or a thermal solvent, or contains neither a high boiling point organic solvent nor a thermal solvent, for the purpose of preventing various disorders or accidents of stickiness of the surface, adhesion of the surface to other substances, re-transfer of the once transferred dye to other substances, and blocking of the surface with the thermal transfer dye donating material as attached thereto.

The total thickness of the image receiving layer is desirably within the range of from about 0.5 to about 50 μm, especially preferably from 3 to 30 μm. Where the image receiving layer is composed of two layers, the thickness of the outermost layer is preferably within the range of from 0.1 to 2 μm, especially preferably from 0.2 to 1 μm.

The thermal transfer image receiving material usable in the present invention may also have an interlayer between the support and the image receiving layer.

Such an interlayer may be any of a cushion layer, a porous layer or a dye diffusion preventing layer, or a layer having two or more functions of such layers. As the case may be, it may also have a role as an adhesive layer.

The dye diffusion preventing layer is one having a function of preventing diffusion of the transferred dye to the support. The binder contained in the dye diffusion preventing layer may be either a water-soluble one or an organic solvent-soluble binder. Preferred is a water-soluble binder. Examples of the water-soluble binder for the layer include those mentioned above as examples of the binder for the image receiving layer. Especially preferred is gelatin.

The porous layer is a layer having the function of preventing diffusion of the heat (as imparted to the image receiving material during thermal transfer process) from the image receiving layer to the support for the purpose of efficiently utilizing the imparted heat.

The image receiving layer, cushion layer, porous layer, diffusion preventing layer and adhesive layer constituting the thermal transfer image receiving material for use in the present invention can contain a fine powder of silica, clay, talc, diatomaceous earth, calcium carbonate, calcium sulfate, barium sulfate, aluminium silicate, synthetic zeolite, zinc oxide, lithopone, titanium oxide, alumina or the like.

The material of the support of constituting the thermal transfer image receiving material for use in the present invention includes any material which is durable and resistant to the transferring temperature and which satisfies all the necessary conditions of smoothness, whiteness, slidability, friction property, antistatic property and depression after transfer may be used. For instance, paper supports include synthetic paper (e.g., polyolefin synthetic paper, polystyrene synthetic paper), high-quality paper, art paper, coated paper, cast-coated paper, wall paper, lining paper, synthetic resin- or emulsion-impregnated paper, synthetic rubber latex-impregnated paper, synthetic resin-incorporated paper, sheet paper, cellulose fiber paper, polyolefin-coated paper (preferably, paper with coated polyethylene on both surfaces); various plastic films or sheets of polyolefins, polyvinyl chloride, polyethylene terephthalate, polystyrene, polymethacrylates or polycarbonates, as well as such plastic films or sheets as surface-treated so as to impart white reflectivity thereto; and laminates comprising any of the above-mentioned paper supports can be used.

The thermal transfer image receiving material for use in the present invention may contain a brightening agent. Examples of usable brightening agents include compounds described in K. Veenkataraman, *The Chemistry of Synthetic Dyes*, Vol. 5, Chap. 8, and JP-A-61-143752. More precisely, stilbene compounds, coumarin compounds, biphenyl compounds, benzoxazolyl compounds, naphthalimide compounds, pyrazoline compounds, carbostyryl compounds, and 2,5-dibenzoxazolethiophene compounds can be used.

The brightening agent may be incorporated into the material along with an anti-fading agent.

For the purpose of improving the releasability of the thermal transfer dye donating material of the present invention from the thermal transfer image receiving material to be applied to the former material, after the thermal transfer process, a releasing agent is desirably incorporated into the layer constituting the dye donating material and/or the layer constituting the image receiving material, more preferably into the outermost layers of both materials facing each other.

As such a releasing agent, any of known releasing agents, for example, solid or waxy substances such as polyethylene wax, amide wax or Teflon powder; fluorine surfactants or phosphate surfactants; as well as paraffin oils, silicone oils or fluorine oils can be used. Especially preferred are silicone oils.

Examples of silicone oils usable for this purpose include non-modified silicone oils as well as modified silicone oils such as carboxy-modified, amino-modified or epoxy-modified silicone oils. Specific examples of such silicone oils include various modified silicone oils as described in the technical reference "Modified Silicone Oils" (issued by Shin-etsu Silicone Co.), pages 6 to 18B. Where the oils are incorporated into an organic solvent binder, amino-modified silicone oils having groups capable of reacting with the crosslinking agent of the binder (for example, groups of reacting with isocyanates) are effective. On the other hand, where they are emulsified and dispersed in a water-soluble binder, carboxy-modified silicone oils (for example, X-22-3710; trade .name by Shin-etsu Silicone Co.) are effective.

The layers constituting the thermal transfer dye donating material of the present invention as well as those constituting the thermal transfer image receiving material which can be applied to the donating material may be hardened with a hardening agent.

Where organic solvent-soluble polymers are hardened, hardening agents as described in JP-A-61-199997 and 58-215398 may be used. An application of isocyanate hardening agents to polyester resins is especially preferred.

On the other hand, for hardening water-soluble polymers, hardening agents as described in U.S. Pat. No. 4,678,739 (column 41), and JP-A-59-116655, 62-245261 and 61-18942 are suitable. More precisely, aldehyde hardening agents (e.g., formaldehyde), aziridine hardening agents, epoxy hardening agents (e.g.,

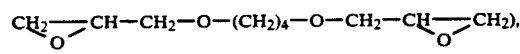

vinylsulfone hardening agents (e.g., N,N'-ethylenebis(-vinylsulfonylacetamido)ethane), N-methylol hardening agents (e.g., dimethylol urea), as well as high polymer hardening agents (e.g., compounds described in JP-A-62-234157) can be used.

The thermal transfer dye donating material of the invention and the thermal transfer image receiving material applicable to the former material may contain an anti-fading agent. Such an anti-fading agent includes, for example, an antioxidant, an ultraviolet absorbent as well as certain metal complexes.

Examples of antioxidants usable for this purpose include chroman compounds, coumaran compounds, phenol compounds (e.g., hindered phenols), hydroquinone derivatives, hindered amine derivatives, and spiroindane compounds. Additionally, compounds described in JP-A-61-159644 are also effectively used.

Examples of usable ultraviolet absorbents include benzotriazole compounds (such as those described in U.S. Pat. No. 3,533,794), 4-thiazolidone compounds (such as those described in U.S. Pat. No. 3,352,681), benzophenone compounds (such as those described in JP-A-56-2784), and other compounds as described in JP-A-54-48535, 62-136641 and 61-88256. Additionally, ultraviolet absorbing polymers described in JP-A-62-260152 are also effective.

Examples of usable metal complexes include compounds as described in U.S. Pat. Nos. 4,241,155, 4,245,018 (columns 3 to 36) and 4,254,195 (columns 3 to 8), JP-A-62-174741 and 61-88256 (pages 27 to 29), and JP-A-1-75568 and JP-A-63-199248 and Japanese Patent Application No. 62-230596.

Specific examples of anti-fading agent usable in the present invention are described in JP-A-62-215272 (pages 125 to 137).

The anti-fading agent having the function of preventing the transferred dyes from fading may be previously added to the image receiving material or, alternatively, it may be supplied later to the material from an external source, for example, by transferring it from the dye donating material attached to the image receiving material.

The above-mentioned antioxidant, ultraviolet absorbent and metal complex can be used in combination.

The layers constituting the thermal transfer dye donating material of the present invention and those constituting the thermal transfer image receiving material which can be applied to the donating material may contain various surfactants as a coating aid and for the purpose of improving the releasability, improving the slide property, preventing static charges and accelerating the developability.

Examples of surfactants usable for this purpose include nonionic surfactants, for example, saponins (steroid type), alkylene oxide derivatives (such as polyethylene glycol, polyethylene glycol alkyl ethers, polyethylene glycol alkylaryl ethers, polyethylene glycol esters, polyethylene glycol sorbitan esters, polyalkylene glycol alkylamines or amides, and silicone-polyethylene oxide adducts), glycidol derivatives (such as alkenylsuccinic acid polyglycerides, and alkylphenol polyglycerides), fatty acid esters of polyalcohols, and alkyl esters of saccharides; anionic surfactants containing an acid group such as a carboxyl group, a sulfo group, a phospho group, a sulfate ester group or a phosphate ester group, for example, alkylcarboxylic acid salts, alkylsulfonic acid salts, alkylnaphthalenesulfonic acid salts, alkylsulfates esters, alkylphosphate esters, N-acyl-N-alkyltaurins, sulfosuccinate esters, sulfoalkyl-polyethylene alkylphenyl ethers, and polyoxyethylene alkylphosphate esters; ampholytic surfactants such as amino acids, aminoalkylsulfonic acids, aminoalkylsulfates or phosphates, alkylbetains, and amine oxides; and cationic surfactants such as alkylamine salts, aliphatic or aromatic quaternary ammonium salts, heterocyclic quaternary ammonium salts such as pyridinium or imidazolium salts, and aliphatic or heterocyclic phosphonium or sulfonium salts. Specific examples of such surfactants are described, for example, in JP-A-62-173463 and 62-183457.

Where a substance capable of accepting thermotransferring dyes, a releasing agent, an anti-fading agent, an ultraviolet absorbent, a brightening agent and other hydrophobic compounds are dispersed in a water-soluble binder, it is recommended that a surfactant is used as a dispersion aid. For this purpose, the above-mentioned surfactants as well as surfactants as described in JP-A-59-157636 (pages 37 to 38) are especially preferably employed.

The layers constituting the thermal transfer dye donating material of the present invention and those constituting the thermal transfer image receiving material applied to the donating material may contain organic fluoro-compounds for the purpose of improving the slide property, preventing static charges and improving the releasability.

Specific examples of organic fluoro-compounds usable for this purpose include fluorine surfactants such as those described in JF-B-57-9053 (columns 8 to 17), and JP-A-61-20944 and 62-135826; as well as hydrophobic fluorine compounds, for example, oily fluorine compounds such as fluorine oil and solid fluorine compounds such as tetrafluoroethylene resins.

The thermal transfer dye donating material of the present invention and the thermal transfer image receiving material which can be applied to the donating material may contain a mat agent. Examples of usable mat agents include compounds described in JP-A-61-88256 (page 29) such as silicon dioxide, polyolefins or polymethacrylates, as well as compounds described in JP-A-63-274944 and JP-A-63-274952 such as benzoguanamine resin beads, polycarbonate resin beads and AS resin beads.

The thermal transfer dye donating material of the present invention can contain one or more dyes of formula (I) optionally along with any other known dyes.

The present invention will be explained in more detail by way of the following examples illustrating manufacture of thermal transfer dye donating material samples, thermal transfer image receiving material samples, printing with the both material samples and test of the transferred samples. However, these examples are not intended to restrict the scope of the present invention.

EXAMPLE 1

Formation of Thermal Transfer Dye Donating Material Sample (1)

A 6 $\mu$m-thick polyethylene terephthalate film (product by Teijin Co.), the back surface of which had been surface-treated to be heat-resistant and lubricative, was used as a support. The following composition (1) for forming a thermal transfer dye donating layer was coated on the opposite surface of the film by wire bar-coating in a dry thickness of 1.5 $\mu$m. Accordingly, a thermal transfer dye donating material sample (1) was prepared.

| Composition (1) for Forming Thermal Transfer Dye Donating Layer: | |
|---|---|
| Dye (No. 2) The dye numbers refer to those in the specification above. | 3 g |
| Polyvinyl Butyral Resin (Denka Butyral 5000-A, product by Denki Kagaku KK) | 2 g |
| Toluene | 50 ml |
| Methyl Ethyl Ketone | 50 ml |
| Polyisocyanate (Takenate D110N, product by Takeda Chemicals Co.) | 0.2 ml |

Other thermal transfer dye donating material samples (2) to (5) and comparative samples (a) and (b) were prepared in the same manner, except that the dye was replaced by a dye as indicated in Table 1 below.

Formation of Thermal Transfer Image Receiving Material Sample (1)

A 150 $\mu$m-thick synthetic paper (YUPO-FPG-150, product by Oji Petrochemical Co.) was used as a support. The following composition (1) for forming a thermal transfer image receiving layer was coated on one surface of the support by wire bar-coating in a dry thickness of 8 μm. Accordingly, a thermal transfer image receiving material sample (1) was prepared. Drying of the coated layer was effected first with a drier for pre-drying and then in an oven having a temperature of 100° C. for 30 minutes.

| Composition (1) for Forming Thermal Transfer Image Receiving Layer: | |
|---|---|
| Polyester Resin (Vylon-200, product by Toyo Spinning Co.) | 25 g |
| Polyisocyanate (KP-90, product by Dai-Nippon Ink Co.) | 4 g |
| Amino-Modified Silicone Oil (KF-857, product by Shin-Etsu Silicone Co.) | 0.5 g |
| Methyl Ethyl Ketone | 100 ml |
| Toluene | 100 ml |

The thermal transfer dye donating material sample and the thermal transfer image receiving material sample thus prepared as mentioned above were attached to each other, with the dye donating layer facing the image receiving layer. A thermal head was applied to the side of the support of the dye donating material to effect printing. As the printing condition, the output power of the thermal head was 0.25 W/dot, the pulse width was from 0.15 to 15 msec, and the dot density was 6 dots/mm. Accordingly, a cyan color image was printed on the image receiving layer of the image receiving material. The cyan color image thus formed was sharp.

The printed material was stored under the condition of exposing it under a fluorescent lamp of 14,000 luxes for 7 days, whereupon the light-fastness of the printed color image was tested.

The status-A reflection density of the printed sample was measured before and after the test, and the light-fastness of the printed image was obtained from the ratio of the measured values.

TABLE 1

| Sample No. | Dye | Transferred Density (maximum density) | Light-Fastness |
|---|---|---|---|
| 1 | 2 | 1.90 | .98 |
| 2 | 3 | 1.95 | .95 |
| 3 | 6 | 1.80 | .98 |
| 4 | 10 | 1.80 | .98 |
| 5 | 11 | 1.85 | .97 |
| a | a | 1.80 | .86 |

TABLE 1-continued

| Sample No. | Dye | Transferred Density (maximum density) | Light-Fastness |
|---|---|---|---|
| b | b | 1.85 | .88 |

Comparative Dye (a):

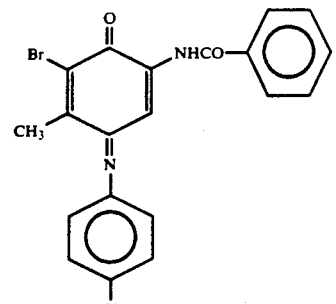

Comparative Dye (b):

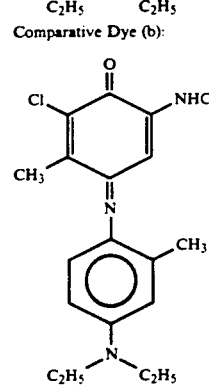

From the results in Table 1 above, it is clear that the dyes in Sample Nos. 1 to 5 of the present invention had a higher light-fastness than the comparative samples (a) and (b) containing comparative

EXAMPLE 2

Thermal transfer dye donating material Sample Nos. (6) to (8) were prepared in the same manner as in Example 1, except that the resin as indicated in Table 2 below was used in place of polyvinyl butyral resin, along with the dye in the same table.

Using the samples, printing was effected in the same way as in Example 1 on the same image receiving material as that used in Example 1. As a result, a sharp image with no blur was formed in every sample. The printed samples were subjected to the same light-fastness test as in Example 1, and the results obtained are shown in Table 2.

TABLE 2

| Sample No. | Resin | Dye | Transferred Density | Light-Fastness |
|---|---|---|---|---|
| 6 | Ethyl Cellulose | 1 | 1.75 | .98 |
| 7 | Cellulose Acetate Butyrate | 2 | 1.90 | .97 |
| 8 | Polysulfone | 3 | 1.95 | .96 |
| c | Ethyl Cellulose | a | 2.10 | .87 |
| d | Cellulose Acetate Butyrate | b | 2.00 | .86 |

From the results in Table 2 above, it is clear that the dyes of the present invention are superior to the comparative dyes.

EXAMPLE 3

Formation of Thermal Transfer Image Receiving Material (2)

A 150 μm-thick synthetic paper (YUPO-FPG-150, product by Oji Petrochemical Co.) was used as a support. The following composition (2) for forming a thermal transfer image receiving layer was coated on one surface of the support by wire bar-coating in a dry thickness of 10 μm. Accordingly, a thermal transfer image receiving material sample (2) was prepared. Drying of the coated layer was effected first with a drier for pre-drying and then in an oven having a temperature of 100° C. for 30 minutes.

| Composition (2) for Forming Thermal Transfer Image Receiving Layer: | |
|---|---|
| Polyester Resin No. 1 (shown below) | 20 g |
| Amino-Modified Silicone Coil (KF-857, product by Shin-Etsu Silicone Co.) | 0.5 g |
| Epoxy-Modified Silicone Oil (KF-100T, product by Shin-Etsu Silicone Co.) | 0.5 g |
| Methyl Ethyl Ketone | 100 ml |
| Toluene | 100 ml |

Polyester Resin No. 1:

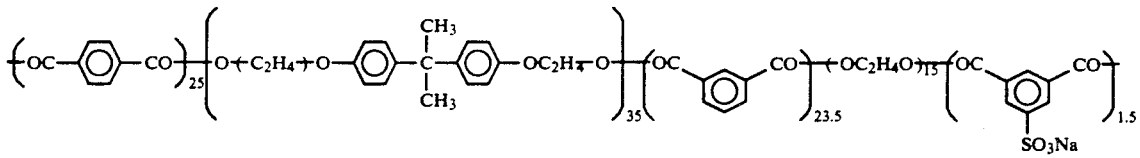

The image receiving material sample thus prepared was combined with one of the dye donating samples as prepared in Example 1 and Example 2 and printing was effected in the same way as in Example 1. As a result, sharp images were formed in all the printed samples. Additionally, the light-fastness of the printed samples from the dyes of the present invention was found to be far superior to that from the comparative dyes.

EXAMPLE 4

Formation of Thermal Transfer Image Receiving Material Sample (3)

A resin-coated paper was prepared by laminating a 15 μ-thick polyethylene and a 25 μ-thick polyethylene on both surfaces of a 200 μ-thick paper. The following composition (3) for forming an image receiving layer was coated on the surface of the 15 μ-thick polyethylene laminate by wire bar-coating in a dry thickness of 10μ. After drying, a thermal transfer image receiving material sample (3) was prepared.

| Composition (3) for Forming Image Receiving Layer: | |
|---|---|
| Polyester Resin No. 1 | 25 g |
| Amino-Modified Silicone Oil (KF 857, product by Shin-Etsu Silicone Co.) | 0.8 g |
| Polyisocyanate (KP-90, product by Dai-Nippon Ink Co.) | 4 g |
| Methyl Ethyl Ketone | 100 ml |
| Toluene | 100 ml |

Using the sample (3), printing was effected in the same way as in Example 3. As a result, sharp images were formed in all the printed samples. Additionally, the light-fastness of the printed samples from the dyes of the present invention was found to be far superior to that from the comparative dyes.

EXAMPLE 5

Formation of Thermal Transfer Image Receiving Material Sample (4)

An organic solvent solution of a dye accepting polymer having the composition (B) mentioned below was dispersed in an aqueous gelatin solution having the composition (A) mentioned below by emulsification with a homogenizer to prepare a gelatin dispersion of the dye accepting substance.

| (A) Aqueous Gelatin Solution: | |
|---|---|
| Gelatin | 2.3 g |
| Sodium Dodecylbenzenesulfonate (5% aqueous solution) | 20 ml |
| Water | 80 ml |
| (B) Dye Accepting Polymer Solution: | |
| Polyester Resin (Vylon 300, product by Toyo Spinning Co.) | 7.0 g |
| Carboxy-Modified Silicone Oil (X-22-3710, product by Shin-Etsu Silicone Co.) | 0.7 g |
| Methyl Ethyl Ketone | 20 ml |
| Toluene | 10 ml |
| Triphenyl Phosphate | 1.5 g |

A solution as prepared by dissolving 0.5 g of a fluorine surfactant (a) $C_3F_7SO_2N(C_3H_7)CH_2COOK$ in 10 ml of a mixed solvent of water/methanol (1/1) was added to the resulting dispersion, to prepare a composition for coating an image receiving layer. The thus prepared composition was coated on a 150 μm-thick synthetic paper (YUPO-SGG-150, product by Oji Petrochemical Co.), one surface of which had been surface-treated by corona-discharging, by wire bar-coating in a wet thickness of 75 μm. The coated layer was then dried.

Using one of the thermal transfer dye donating material Sample No. (1) to (8) as prepared in Examples 1 and 2 and the thermal transfer image receiving material sample (4) prepared above, printing was effected in the same way as in Example 1.

As a result, all the printed images had a high density and were sharp. The light-fastness of the images were much superior to that of the images from the corresponding comparative samples.

EXAMPLE 6

Printing was effected in the same way as in Example 1, using the same materials as those in Example 1 except that the dye was replaced by Dye No. 1, 4, 9, 16, 17, 21, 28, 31, 40, 42 or 50. As a result, sharp images were formed on all the printed samples. The light-fastness of the images were much superior to that of the images from the corresponding comparative samples.

While the invention has been described in detail and with reference to specific embodiments thereof, it will be apparent to one skilled in the art that various changes and modifications can be made therein without departing from the spirit and scope thereof.

What is claimed is:

1. A thermal transfer dye donating material, which comprises a support having thereon a dye donating layer containing a dye represented by formula (I):

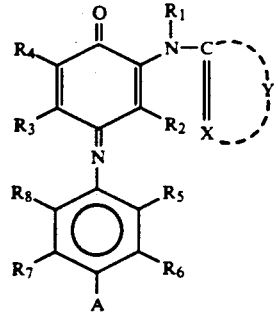

wherein $R_1$ represents a hydrogen atom or an alkyl group; $R_2$ to $R_8$, which may be the same or different, each represents a hydrogen atom, an alkyl group, an alkoxy group, a halogen atom, an acylamino group, an alkoxycarbonyl group, a cyano group, an alkoxycarbonylamino group, an aminocarbonylamino group, a sulfonylamino group, a carbamoyl group, a sulfamoyl group or an acyl group; A represents

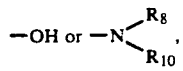

wherein $R_9$ and $R_{10}$, which may be the same or different, each represents a hydrogen atom, an alkyl group or an aryl group; X represents a nitrogen atom or

$R_{11}$ representing a hydrogen atom, an alkyl group or an aryl group; Y represents a non-metallic atomic group necessary for forming a 5-membered to 7-membered ring; and $R_3$ and $R_4$ may optionally be bonded to each other to form a ring, and any or all of the groups $R_6$ and $R_9$, $R_9$ and $R_{10}$, and $R_7$ and $R_{10}$ may optionally be bonded to each other to form a ring.

2. A thermal transfer dye donating material as in claim 1, wherein $R_1$ represents a hydrogen atom or an alkyl group having from 1 to 10 carbon atoms.

3. A thermal transfer dye donating material as in claim 1, wherein $R_2$ to $R_8$, which may be the same or different, each are a hydrogen atom, an alkyl group having from 1 to 10 carbon atoms, an alkoxy group having from 1 to 10 carbon atoms, a halogen atom, an alkylcarbonylamino group having from 1 to 10 carbon atoms, a viynylcarbonylamino group having from 3 to 10 carbon atoms, an arylcarbonylamino group having from 7 to 15 carbon atoms, a heterocyclic carbonylamino group having from 5 to 13 carbon atoms, an alkoxycarbonyl group having from 2 to 10 carbon atoms, a cyano group, an alkoxycarbonylamino group having from 2 to 10 carbon atoms, an aminocarbonylamino group having from 1 to 10 carbon atoms, a sulfonylamino group having from 1 to 10 carbon atoms, an alkylcarbamoyl group having from 1 to 12 carbon atoms, an arylcarbamoyl group having from 7 to 15 carbon atoms, a heterocycliccarbamoyl group having from 4 to 12 carbon atoms, a sulfamoyl group having from 0 to 12 carbon atoms, an alkylcarbonyl group having from 1 to 10 carbon atoms, an vinylcarbonyl group having from 3 to 10 carbon atoms or an arylcarbonyl group having from 7 to 15 carbon atoms 4. A thermal transfer dye donating material as in claim 1, wherein $R_9$ and $R_{10}$ each are a hydrogen atom, an alkyl group having from 1 to 12 carbon atoms and an aryl group having from 6 to 12 carbon atoms.

5. A thermal transfer dye donating material as in claim 1, wherein the hetero ring formed by Y is selected from the group consisting of pyrrole ring, pyridine ring, pyrazole ring, imidazole ring, 1,2,3-triazole ring, 1,2,4-triazole ring, tetrazole ring, pyrimidine ring, dihydropyrimidine ring, oxazine ring, pyrazine ring, pyridazine ring, oxazole ring, isoxazole ring, thiazole ring, dihydrothiazole ring, 2-thiazolone ring, triazine ring, and thiadiazole ring.

6. A thermal transfer dye donating material as in claim 1, wherein $R_1$, $R_2$, $R_6$, $R_7$ and $R_8$ are hydrogen atoms; $R_3$ is an alkyl group having from 1 to 4 carbon atoms, an alkylcarbonylamino group having from 2 to 10 carbon atoms, or an arylcarbonylamino group having from 6 to 10 carbon atoms; $R_4$ is a chlorine atom or a hydrogen atom; $R_5$ is a hydrogen atom, an alkyl group having from 1 to 3 carbon atoms, an alkoxy group having from 1 to 3 carbon atoms, an acylamino group having from 1 to 4 carbon atoms or an alkoxycarbonylamino group having from 1 to 4 carbon atoms; $R_9$ and $R_{10}$ each are an alkyl group having from 2 to 7 carbon atoms; X is a nitrogen atom; and the hetero ring formed by Y is an s-triazine ring.

7. A thermal transfer dye donating material as in claim 1, wherein the dye donating layer contains the dye represented by formula (I) in an amount of from 0.03 to 1 g/m².

8. A thermal transfer dye donating material as in claim 1, wherein the dye donating layer has a thickness of about 0.2 μm to 5 μm as a dry thickness.

9. A thermal transfer dye donating material as in claim 8, wherein the thickness is from 0.4 μm to 2 μm.

10. A thermal transfer dye donating material as in claim 1, wherein the thermal transfer dye donating material comprises two or more dye donating layers, each containing a different dye.

11. A thermal transfer dye donating material as in claim 1, wherein the thermal transfer dye donating material is used in combination with a thermal transfer image receiving material comprising an image receiving layer on a support.

* * * * *